United States Patent
Tomaru et al.

[11] Patent Number: 6,068,296
[45] Date of Patent: May 30, 2000

[54] SHOCK ABSORBING TYPE STEERING COLUMN ASSEMBLY

[75] Inventors: Masaki Tomaru, Shibukawa; Yuichiro Fukunaga, Yoshioka-machi; Yasushi Watanabe, Maebashi, all of Japan

[73] Assignee: NSK Ltd., Tokyo, Japan

[21] Appl. No.: 08/960,209

[22] Filed: Oct. 29, 1997

[30] Foreign Application Priority Data

Nov. 15, 1996 [JP] Japan .................................. 8-304475

[51] Int. Cl.[7] ...................................................... B62D 1/19
[52] U.S. Cl. ............................................................ 280/777
[58] Field of Search .............................................. 280/777

[56] References Cited

U.S. PATENT DOCUMENTS

| | | | |
|---|---|---|---|
| 3,824,665 | 7/1974 | Saito | 29/200 B |
| 4,674,354 | 6/1987 | Brand | 74/725 |
| 4,991,871 | 2/1991 | Sadakata | 280/777 |
| 5,071,163 | 12/1991 | Heinrichs et al. | 280/777 |
| 5,235,734 | 8/1993 | DuRocher et al. | 29/455.1 |
| 5,464,251 | 11/1995 | Castellon | 280/777 |
| 5,503,431 | 4/1996 | Yamamoto | 280/777 |
| 5,580,314 | 12/1996 | Moriyama et al. | 280/777 |
| 5,623,756 | 4/1997 | Yanagidate et al. | 29/525 |

FOREIGN PATENT DOCUMENTS

| | | |
|---|---|---|
| 52-3219 | 1/1977 | Japan . |
| 62-143763 | 6/1987 | Japan . |
| 1-58373 | 4/1989 | Japan . |
| 2-286468 | 11/1990 | Japan . |
| 6-8150 | 2/1994 | Japan . |
| 8-91230 | 4/1997 | Japan . |

*Primary Examiner*—Kenneth R. Rice
*Attorney, Agent, or Firm*—Vorys, Sater, Seymour and Pease LLP

[57] ABSTRACT

A shock absorbing type steering column assembly which is incorporated in the steering apparatus of an automobile, comprises one end portion of an outer column member formed with a female serration at one end thereof and one end portion of an inner column member formed with a male serration at one end thereof being in engagement with each other, one end portion of the outer column member being in pressure-fitting relationship to a center-side portion in the axial direction of the inner column member to form a first fitted portion, while one end portion of the inner column member is in pressure-fitting relationship to a center-side portion in the axial direction of the outer column member to form a second fitted portion, and pressure fitting strength at the first fitted portion being substantially equal to that at the second fitted portion.

6 Claims, 10 Drawing Sheets

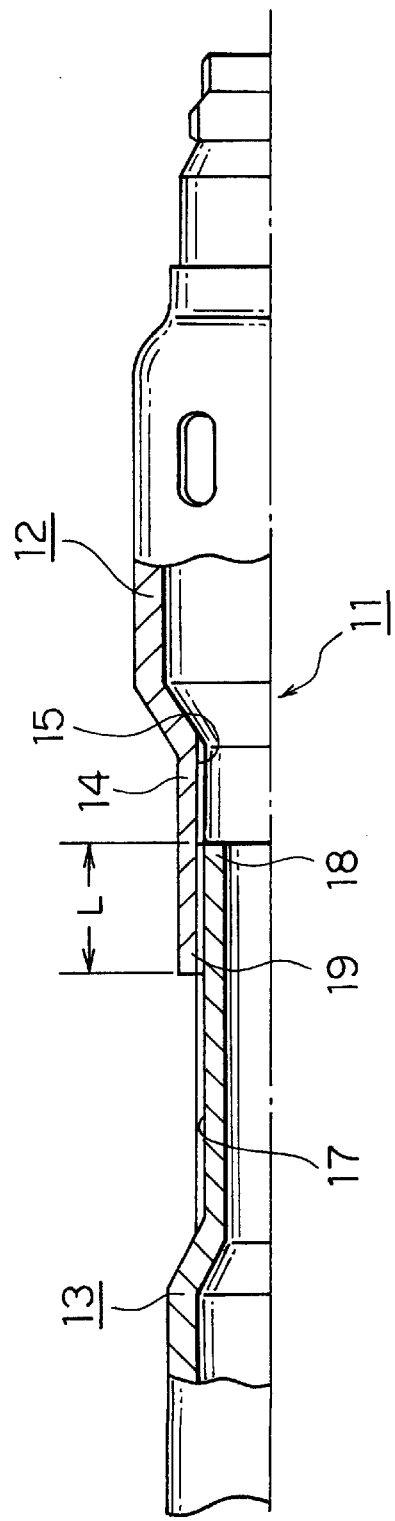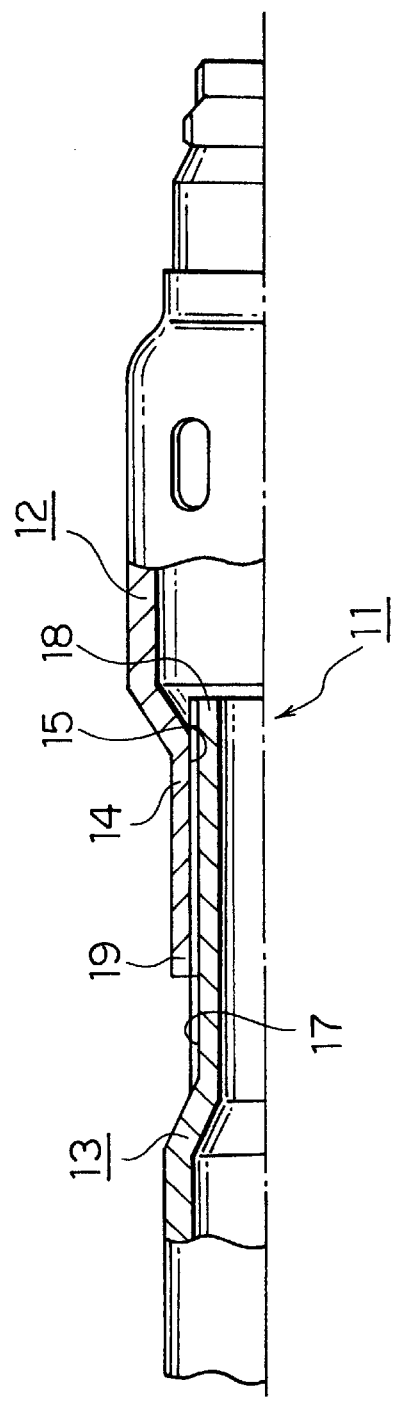

SHOCK ABSORBING TYPE STEERING COLUMN ASSEMBLY

This application claims the benefit of Japanese Application No. 8-304475 which is hereby incorporated by reference.

BACKGROUND OF THE INVENTION

1. Field of the Invention

The present invention relates to a shock absorbing type steering apparatus of an automobile, especially a shock absorbing type steering column assembly which is incorporated in the steering apparatus and utilized to transmit the movement of a steering wheel to a steering gear. The present invention also relates to a method of adjusting a contraction load of a shock absorbing type steering column assembly. The method is used to regulate a load required for contracting the total length of the steering shaft during a collision to a desired value.

2. Related Background Art

In a steering apparatus for an automobile, a steering mechanism is used to transmit the movement of a steering wheel to a steering gear. A first steering shaft having a steering wheel fixed to the upper end portion thereof is rotatably inserted in a steering column. This steering column is fixed to the lower surface of an instrument panel by upper and lower brackets. The upper end portion of a second steering shaft is connected through a first universal joint to a lower end portion of the first steering shaft which protrudes from a lower end opening of the steering column. Further, the lower end portion of this second steering shaft is connected through a second universal joint to a third steering shaft leading to a steering gear. In the steering mechanism thus constructed, the movement of the steering wheel is transmitted to the steering gear through the first steering shaft inserted through the steering column, the first universal joint, the second steering shaft, the second universal joint, and the third steering shaft to give a steering angle to wheels.

In the steering mechanism thus constructed, the steering column and the steering shafts are usually made into a shock absorbing type in which the total length shortens due to a shock in order to protect a driver during a collision. The structure described in Japanese Patent Application Laid-Open No. 8-91230 is known as such a shock absorbing type steering shaft. FIGS. 10 to 16 show the shock absorbing type steering shaft described in this application, while FIG. 17 to 21 show a method of manufacturing the shock absorbing type steering shaft which is also described in this application.

This shock absorbing type steering shaft 11 is constructed such that an outer shaft 12 and an inner shaft 13 are combined for relative displacement in an axial direction (the left to right direction as viewed in FIG. 10), whereby the total length of the shaft shortens when an impact force in the axial direction is applied. The outer shaft 12 as a whole is of a tubular shape and one end portion (the left end portion as viewed in FIGS. 10 and 14) thereof is subjected to drawing, whereby a small-diametered portion 14 is formed in this end portion. A female serration 15 is formed on the inner peripheral surface of this small-diametered portion 14. The inner shaft 13 as a whole is also of a tubular shape and one end portion (the right end portion as viewed in FIGS. 10 and 11) thereof is widened to thereby form a large-diametered portion 16. A male serration 17 is formed on the outer peripheral surface of this large-diametered portion 16 to be engaged with the female serration 15.

Also, the fore end portion (the right end portion as viewed in FIGS. 10 and 11) of the large-diametered portion 16 is squeezed a little in the diametral direction thereof, whereby a first deformed portion 18 of an elliptical cross-sectional shape is formed over a length L. The major axis d1 of this first deformed portion 18 is larger than the diameter d0 of the body portion of the large-diametered portion 16, and the minor axis d2 of the first deformed portion is smaller than this diameter d0 (d1>d0>d2). Note that the diameters of the large-diametered portion 16 on which the male serration 17 is formed are all represented by the diameter (pcd) of that portion of the serration which corresponds to a pitch circle.

On the other hand, the fore end portion (the left end portion as viewed in FIGS. 10 and 14) of the small-diametered portion 14 is also squeezed a little in the diametral direction thereof, whereby a second deformed portion 19 of an elliptical cross-sectional shape is formed over the length L. The major axis D1 of this first deformed portion 19 is larger than the diameter D0 of the body portion of the small-diametered portion 14, and the minor axis D2 of the second deformed portion 19 is smaller than this diameter D0 (D1>D0>D2). The diameters of the small-diametered portion 14 on which the female serration 15 is formed are also all represented by the diameter (pcd) of that portion of the serration which corresponds to a pitch circle.

The diameter D0 of the small-diametered portion 14 is made slightly larger than the diameter d0 of the large-diametered portion 16 (D0>d0) so that the female serration 15 and the male serration 17 may be brought into loose engagement with each other in portions other than the first and second deformed portions 18 and 19. However, the major axis d1 of the first deformed portion 18 is made slightly larger than the diameter D0 of the body portion of the small-diametered portion 14 (d1>D0) and the minor axis D2 of the second deformed portion 19 is made slightly smaller than the diameter d0 of the body portion of the large-diametered portion 16 (D2<d0).

The outer shaft 12 and the inner shaft 13 having such shapes as described above are combined together as shown in FIG. 10 to thereby provide the shock absorbing type steering shaft 11. More specifically, the large-diametered portion 16 formed on one end portion of the inner shaft 13 is located inside the small-diametered portion 14 formed on one end portion of the outer shaft 12, and the female serration 15 on the inner peripheral surface of the small-diametered portion 14 and the male serration 17 on the outer peripheral surface of the large-diametered portion 16 are brought into engagement with each other. In this state, the first deformed portion 18 formed on the fore end portion of the large-diametered portion 16 is pushed into a base end portion (the right end portion as viewed in FIGS. 10 and 14) of the small-diametered portion 14 while being elastically deformed (or plastically deformed). Also, the second deformed portion 19 formed on the fore end portion of the small-diametered portion 14 is pushed into a base end portion (the left end portion as viewed in FIGS. 10 and 11) of the large-diametered portion 16 while also being elastically deformed (or plastically deformed).

Accordingly, in the state in which the outer shaft 12 and the inner shaft 13 are combined together as shown in FIG. 10, the outer peripheral surface of the first deformed portion 18 is frictionally engaged with the inner peripheral portion of the base end portion of the small-diametered portion 14, and the inner peripheral surface of the second deformed portion 19 is frictionally engaged with the outer peripheral portion of the base end portion of the large-diametered portion 16, respectively. As a result, the outer shaft 12 and the inner shaft 13 are coupled together for the transmission of a rotational force between the two shafts 12 and 13, but against relative displacement in the axial direction so long as a strong force is not applied.

As described, the coupling between the outer shaft 12 and the inner shaft 13 is effected by bringing the first and second deformed portions 18 and 19 formed on the metallic outer shaft 12 and the inner shaft 13 into pressure-fitting with partner members and therefore, the heat resisting property of the coupling portion becomes sufficient and it never happens that the supporting force of the coupling portion becomes deficient depending on use conditions. Also, the first and second deformed portions 18 and 19 are provided at two axially spaced locations in the coupling portion between the outer shaft 12 and the inner shaft 13 and therefore, the bending rigidity of the coupling portion between the outer shaft 12 and the inner shaft 13 is also sufficiently secured.

Further, when a strong force is applied in the axial direction during collision, the outer shaft 12 and the inner shaft 13 are displaced relative to each other in the axial direction against a frictional force which is exerted on the pressure-fitted portions by the first and second deformed portions 18 and 19, to thereby shorten the total length of the shock absorbing type steering shaft 11. In the case of such a shock absorbing type steering shaft 11, the force required to shorten the total length suffices if it overcomes the frictional force exerted on the above-described two pressure-fitted portions. Accordingly, a contraction load (a collapse load) required to shorten the total length of the shock absorbing type steering shaft 11 is stable without becoming great, thereby effectively preventing a great impact force from being applied to a driver's body which has collided against the steering wheel in the course of an accident.

When the outer shaft 12 and the inner shaft 13 are to be combined together to thereby construct such a shock absorbing type steering shaft 11 as shown in FIG. 10, the two shafts 12 and 13 are first combined together as shown in FIG. 17. More specifically, the female serration 15 and the male serration 17 are brought into engagement with each other by the fore end portion of the small-diametered portion 14 and the fore end portion of the large-diametered portion 16. Then, with these serrations 15 and 17 kept in engagement with each other, the outer peripheral surface of the small-diametered portion 14 is pressed inwardly in the diametral direction thereof. That is, a pair of pressing pieces 20 and 20 are disposed around the fore end portion of the small-diametered portion 14 and the fore end portion of the large-diametered portion 16, and the pair of pressing pieces 20 and 20 are brought close to each other to thereby press the outer peripheral surface of the small-diametered portion 14 strongly. The inner side surfaces of these pressing pieces 20 and 20 which bear against the outer peripheral surface of the small-diametered portion 14 are provided with recesses 21 and 21 of an arcuate cross-sectional shape which are in close contact with this outer peripheral surface.

Gaps 22 and 22 having a thickness dimension δ are formed between the end surfaces of the pair of pressing pieces 20 and 20 with the recesses 21 and 21 brought into light contact with the outer peripheral surface of the small-diametered portion 14. Also, these pressing pieces 20 and 20 are strongly pressed toward each other by a pressing device, not shown, such as a hydraulic mechanism. So, if as shown in FIG. 19, the pair of pressing pieces 20 and 20 are moved toward each other until the thickness of the gaps 22 and 22 becomes zero, the cross-sectional shape of the fore end portion of the small-diametered portion 14 will be plastically deformed into an elliptical shape, as shown in FIG. 19.

Further, the fore end portion of the large-diametered portion 16 which is inserted in the fore end portion of this small-diametered portion 14 is also pushed in the same direction through the two serrations 15 and 17. Then, the cross-sectional shape of the fore end portion of this large-diametered portion is also plastically deformed into an elliptical shape, as shown in FIG. 19.

In this manner, the fore end portion of the small-diametered portion 14 and the fore end portion of the large-diametered portion 16 are pressed inwardly in the diametral direction thereof and the cross-sectional shapes of these two fore end portions are plastically deformed into an elliptical shape, whereafter the outer shaft 12 and the inner shaft 13 are displaced relative to each other toward each other in the axial direction. That is, after these two shafts 12 and 13 have been taken out of the pair of pressing pieces 20 and 20, the outer shaft 12 is displaced leftward as viewed in FIG. 17 relative to the inner shaft 13 while the inner shaft 13 is displaced rightwardly as viewed in FIG. 17 relative to the outer shaft 12. Then, as shown in FIG. 10, the fore end portion of the small-diametered portion 14 is pressure-fitted onto the base end portion of the large-diametered portion 16, while the fore end portion of the large-diametered portion 16 is pressure-fitted into the base end portion of the small-diametered portion 14. The intermediate portion of the small-diametered portion 14 and the intermediate portion of the large-diametered portion 16 which are not plastically deformed by the pressing pieces 20 and 20 are brought into loose engagement with each other.

In the case of the structure described in the above-mentioned Japanese Patent Application Laid-Open No. 8-91230, as shown in FIG. 20, the inner surfaces of pressing pieces 20a and 20a for plastically deforming the fore end portions (see FIG. 17) of the small-diametered portion and the large-diametered portion which are engaged with each other are not formed with the recesses 21 and 21 (FIGS. 18 and 19), but are made into simple flat surfaces. Or, as shown in FIG. 21, a pair of pressing pieces 20b and 20b are formed into a V block shape so that the pressing pieces 20b and 20b press the fore end portions (see FIG. 17) of the small-diametered portion 14 and the large-diametered portion 16 which are engaged with each other at two locations each, i.e., four locations in total.

In the case of the shock absorbing type steering shaft 11 which is actually incorporated in a vehicle, a load necessary for shortening the total length is required to be regulated to a desirable value. If a so-called secondary collision occurs wherein the body of a driver collides with the steering wheel (FIG. 8) in the course of an accident, this steering wheel 1 is displaced forward while contracting the shock absorbing type steering shaft 11 and the steering column 3 (FIG. 8). In order to smoothly effect such forward displacement of the steering wheel 1 while absorbing the impact applied on the body of the driver, it is necessary to regulate the load required for contracting the shock absorbing type steering shaft 11 and the steering column 3 to a desirable value.

Also, it is necessary to provide a high bending rigidity of the steering shaft 11 and steering column 3.

In the Japanese patent application Laid-Open No. 8-91230 as described above, the pressing pieces 20, 20; 20a, 20a and 20b, 20b are pressed by a constant amount or length of the gaps δ.

According to this technique, however, contraction load obtained somewhat fluctuates and also the bending rigidity fluctuates or is not stable.

Taking these circumstances into consideration, experiments were conducted by the method of the prior invention shown in FIGS. 17 to 21 to investigate the regulation of the contraction load. As a result, it was found that a difference in shape among the pressing pieces 20, 20a and 20b gives a large influence on the obtained contraction load of the shock absorbing type steering shaft.

SUMMARY OF THE INVENTION

The present invention was conceived in light of the aforementioned investigation and, in one of its aspects, provides a shock absorbing type steering column assembly which is incorporated in the steering apparatus of an automobile, comprising one end portion of an outer column member formed with a female serration at one end thereof and one end portion of an inner column member formed with a male serration at one end thereof being in engagement with each other, one end portion of said outer column member being in pressure-fitting relationship to a center-side portion in the axial direction of said inner column member to form a first fitted portion, while one end portion of said inner column member is in pressure-fitting relationship to a center-side portion in the axial direction of said outer column member to form a second fitted portion, and pressure fitting strength at said first fitted portion being substantially equal to that at said second fitted portion.

The present invention provides further a shock absorbing type steering column assembly which is incorporated in the steering apparatus of an automobile, comprising one end portion of an outer column member formed with a female serration at one end thereof and one end portion of an inner column member formed with a male serration at one end thereof being in engagement with each other, one end portion of said outer column member being in pressure-fitting relationship to a center-side portion in the axial direction of said inner column member to form a first fittedportion, one endportion of said inner column member being in pressure-fitting relationship to a center-side portion in the axial direction of said outer column member to form a second fitted portion.

The present invention further provides method of adjusting contraction load of a shock absorbing type steering column assembly which is incorporated in the steering apparatus of an automobile, comprising the steps of, in the state where one end portion of an outer column member formed with a female serration at one end thereof and one end portion of an inner column member formed with a male serration at one end thereof are brought into engagement with each other, pressing the outer peripheral surface of the outer shaft inwardly in a diametral direction to plastically deform the one end portion of the outer shaft and the one end portion of the inner shaft in the diametral direction, using a pair of pressing pieces whose pressing surfaces are flat and parallel to each other; adjusting a pressing load for bringing the pair of pressing pieces toward each other to regulate a contraction load for contracting the total length of the shock absorbing type steering column assembly to a desired value;

relatively displacing said outer shaft and said inner shaft toward each other along the axial direction thereof to bring one end portion of said outer column member into pressure-fitting relationship to a center-side portion in the axial direction of said inner column member to form a first fitted portion, while bringing one end portion of said inner column member into pressure-fitting relationship to a center-side portion in the axial direction of said outer column member to form a second fitted portion.

According to the method of adjusting a contraction load of a shock absorbing type steering shaft of the present invention as described above, it is possible to realize a steering device which is effectively capable of protecting a driver during a secondary collision by regulating the load required for contracting the shock absorbing type steering shaft into a desirable value.

BRIEF DESCRIPTION OF THE DRAWINGS

FIG. 3 is a partial cross-sectional view for showing a second-half step of the embodiment of the present invention.

FIG. 4 is a partial cross-sectional view for showing the state in which a shaft has been contracted due to a collision accident.

DESCRIPTION OF THE PREFERRED EMBODIMENTS

Figure 8:
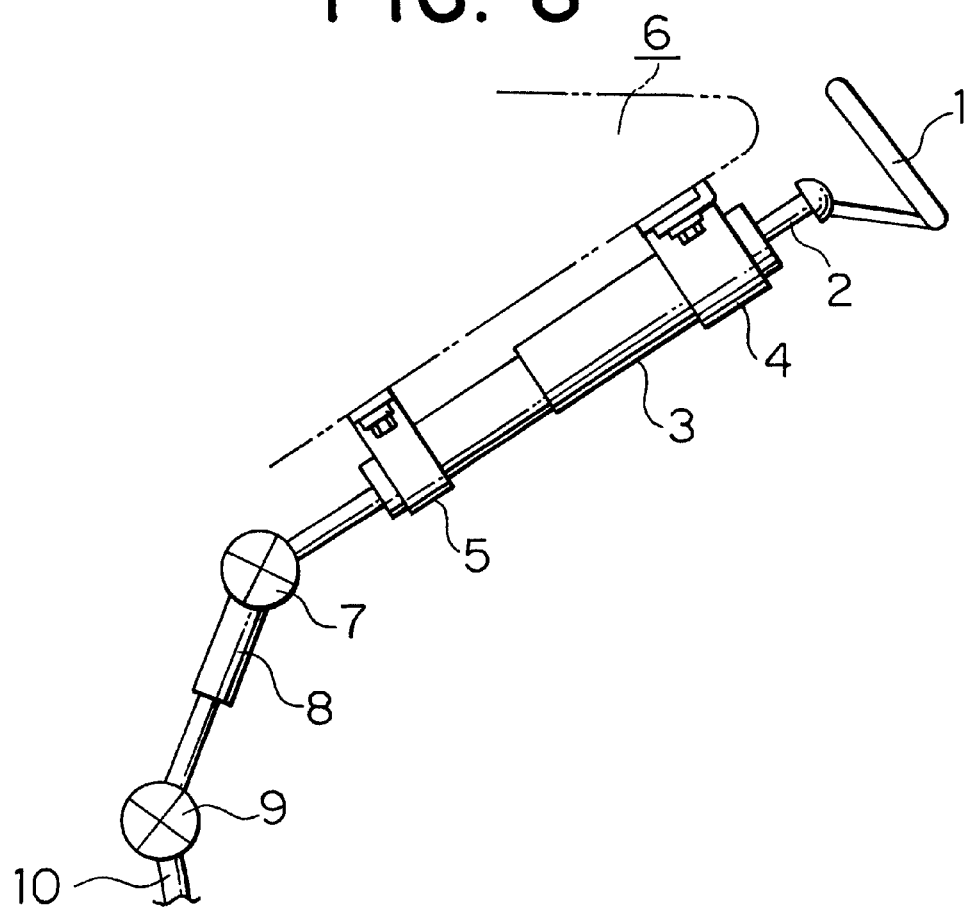
FIG. 8 is a side view for showing an example of the steering mechanism having a shock absorbing type steering shaft to which the present invention is to be applied incorporated therein.

FIG. 8 of the accompanying drawings shows a steering mechanism which is used to transmit the movement of a steering wheel to a steering gear and in which a shock absorbing type column assembly of the present invention is adopted. The first steering shaft 2 having a steering wheel 1 fixed to the upper end portion thereof is rotatably inserted in a steering column 3. This steering column 3 is fixed to the lower surface of an instrument panel 6 by upper and lower brackets 4 and 5. The upper end portion of a second steering shaft 8 is connected through a first universal joint 7 to a lower end portion of the first steering shaft 2 which protrudes from the lower end opening of the steering column 3. Further, the lower end portion of this second steering shaft 8 is connected through a second universal joint 9 to a third steering shaft 10 leading to a steering gear (not shown). In the steering mechanism thus constructed, the movement of the steering wheel 1 is transmitted to the steering gear through the first steering shaft 2 inserted through the steering column 3, the first universal joint 7, the second steering shaft 8, the second universal joint 9, and the third steering shaft 10 to give a steering angle to wheels.

In the steering mechanism thus constructed, a steering column assembly such as the steering column 3 as well as the steering shaft 2, 8 or 10 is usually made into a shock absorbing type in which the total length shortens due to a shock in order to protect a driver during collision.

FIGS. 1 to 4 show an example of the method of adjusting a contraction load of a shock absorbing type steering shaft which is a column assembly as an embodiment of the present invention. A shock absorbing type steering shaft or column assembly 11 corresponds to the steering shaft 2 in FIG. 8. The basic structure itself of the column assembly 11 for which a contraction load is adjusted by the method of the present invention is the same as that of a conventionally-known shock absorbing type steering shaft shown above in FIGS. 10 to 16. The basic mechanism of the method of manufacturing this shock absorbing type steering shaft 11 itself is the same as that of the conventionally-known method of manufacturing a shock absorbing type steering shaft shown in FIGS. 17 to 21, discussed above. According to the present invention, however, pressing pieces having flat pressing portions are used, and a sufficient gap is formed between the pressing pieces so that the pressing load can be adjustable. It should be noted that in contrast to the pressing pieces 20 and 20 shown in FIG. 20, which are simply displaced relative to each other by the thickness dimension δ of the gaps 22 and 22 formed between the two pressing pieces, the pressing pieces used for the method of the present invention have sufficient distance therebetween so that the pressing load is freely adjustable or changeable.

Figure 1:
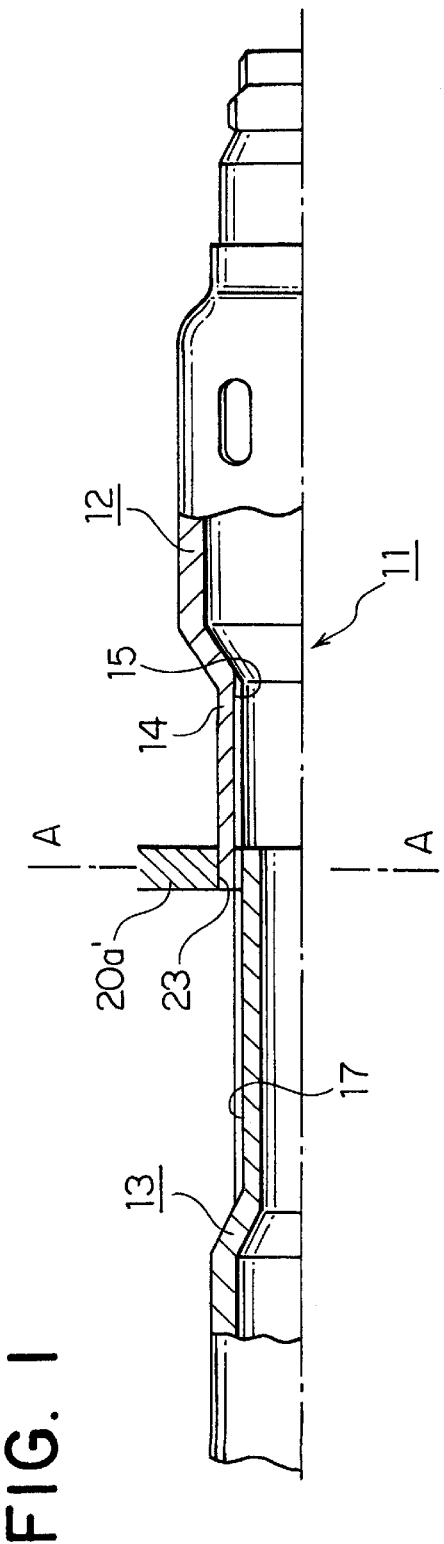
FIG. 1 is a partial cross-sectional view for showing a first-half step of an embodiment of the present invention.
Figure 2:
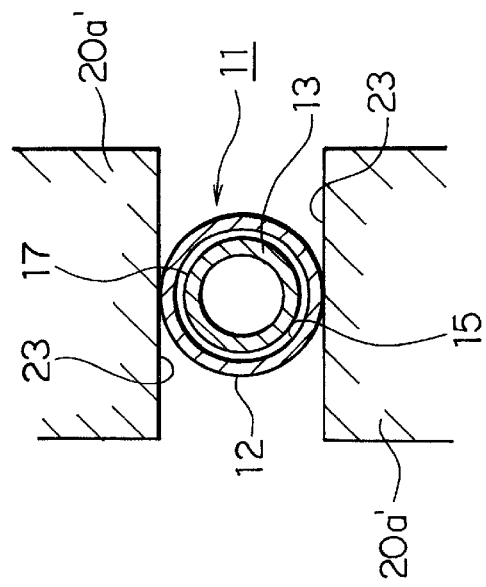
FIG. 2 is a cross-sectional view taken along the line A—A of FIG. 1.
Figure 19:
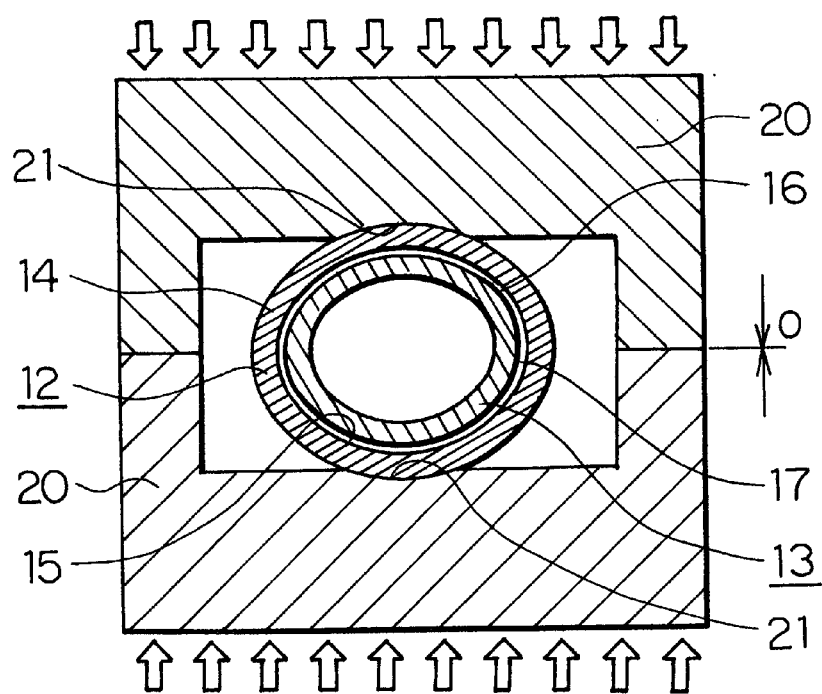
FIG. 19 is a cross-sectional view taken along in the same manner as FIG. 18 in a state after plastic deformation.
Figure 20:
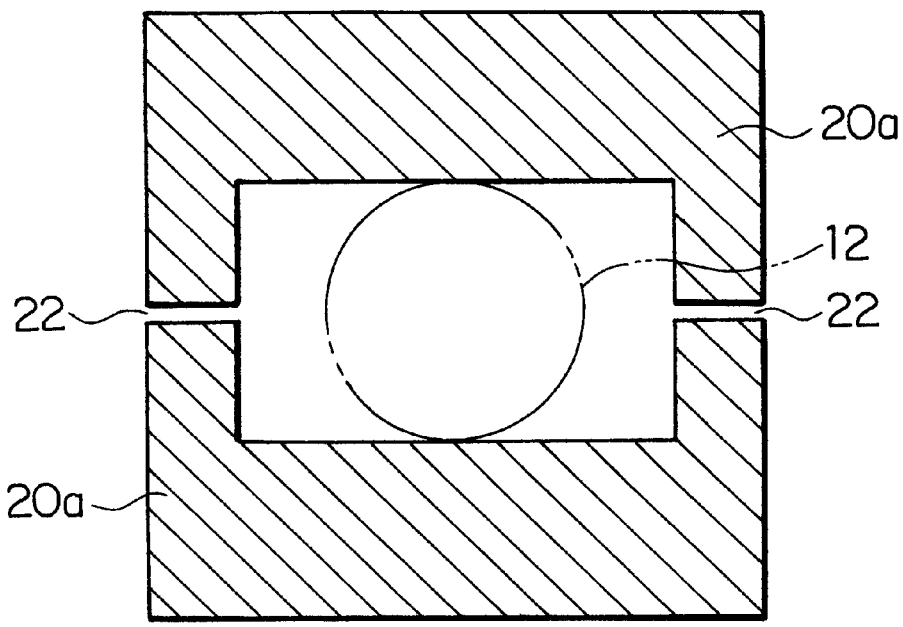
FIG. 20 is a cross-sectional view taken along in the same manner as FIG. 18, for showing a step of a second known method of manufacturing a shock absorbing type steering shaft.

In order to carry out the method of adjusting a contraction load of a shock absorbing type steering column assembly as the first embodiment of the present invention, a female serration 15 and a male serration 17 formed, respectively, on the peripheral surfaces of the shafts or column members 12 and 13 are first brought into engagement with each other at a fore end portion (the left end portion as viewed in FIGS. 1, 3 and 4) of the outer column member shaft 12 and a rear end portion (the right end portion as viewed in FIGS. 1, 3 and 4) of the inner column member or shaft 13, as shown in FIG. 1. In the state in which these serrations 15 and 17 are engaged with each other, the outer peripheral surface of the outer column member or shaft 12 is pressed inwardly in the diametral direction thereof by a pair of pressing pieces 20a' and 20a' which are displaced toward each other, see FIGS. 1 and 2. Thus, the fore end portion of the outer member 12 and the rear end portion of the inner member 13 are pressed in the diametral direction by the pressing pieces 20a' and 20a' so that the cross sections of these end portions are plastically deformed into the respective elliptical shapes. The elliptical shapes are as shown in FIG. 19, although the pressing pieces 20a' and 20a' used differ from ones shown in FIG. 19.

Particularly, for the method of adjusting a contraction load of a shock absorbing type steering shaft of the present invention, a pair of pressing pieces in which the pressing surfaces 23 and 23 are flat and parallel to each other are used as the above-mentioned pair of pressing pieces 20a' and 20a'. While these pressing surfaces 23 and 23 are kept parallel to each other, the above-mentioned pair of pressing pieces 20a' and 20a' are brought toward to each other. As above-described, a distance between the pressing pieces 20a' and 20a' is large enough so the pressing load is adjustable.

With the cross sections of the fore end portion of the outer shaft 12 and the rear end portion of the inner shaft 13 thus deformed into the respective elliptical shapes by the pair of pressing pieces 20a' and 20a', the outer shaft 12 and the inner shaft 13 are urged to displace toward each other. Then, as shown in FIG. 3, the fore end portion of the outer shaft 12 and the rear end portion of the inner shaft 13 are laid to overlap each other only by a desired length L in the axial direction. This desired length L is a normal fitting length by which the above-mentioned outer shaft 12 and inner shaft 13 are fitted to each other in a normal state (a state in which no accident has occurred). At a secondary collision, as shown in FIG. 4, a fitting length between the outer shaft 12 and the inner shaft 13 is larger than the above-mentioned normal fitting length L so that the total length of the above-mentioned shock absorbing type steering shaft 11 is shortened. In the case of the method of adjusting a contraction load of a shock absorbing type steering shaft of the present invention, a pressing load for bringing the above-mentioned pair of pressing 20a' and 20a' close to each other is changed in order to regulate the contraction load for contracting the total length of the above-mentioned shock absorbing type steering shaft 11 into a desirable value.

Figure 5:
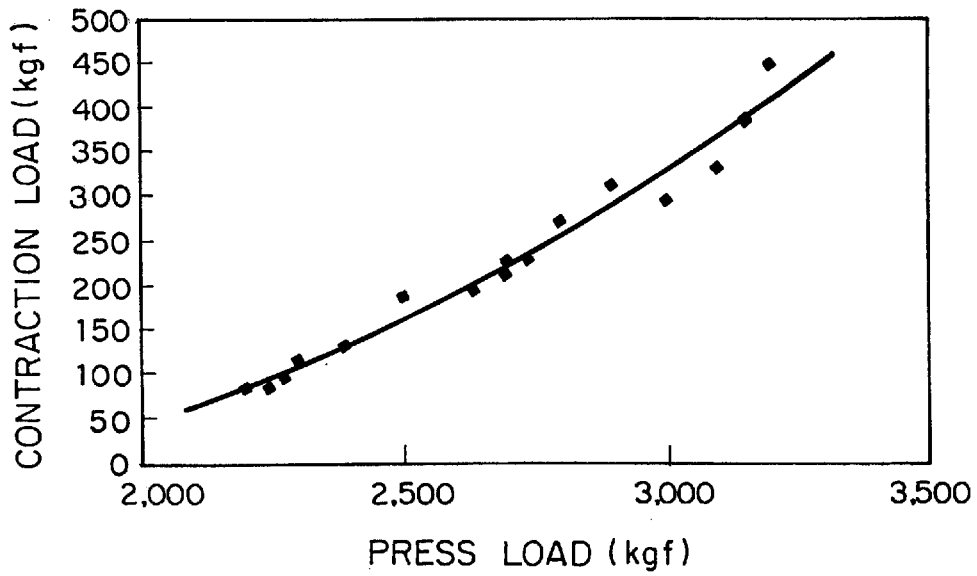
FIG. 5 is a graph for showing the relation between a pressing load and a contraction load when the contraction load is adjusted according to the method of the present invention.

More specifically, according to the experiments conducted by the present inventors, when a pair of pressing pieces 20a' and 20a' whose pressing surfaces 23 and 23 are flat andparallel to each other are used as the pair of pressing pieces, and these pressing pieces 20a' and 20a' are brought toward to each other while the pressing surfaces 23 and 23 are kept parallel to each other, the relation between the pressing load for bringing the pressing pieces 20a' and 20a' toward to each other and the above-mentioned contraction load is as shown in FIG. 5. As clearly shown in FIG. 5, the pressing load and the contraction load are substantially proportional to each other. Accordingly, it is possible to regulate the contraction load into a desirable value by adjusting the pressing load. Note that the contraction load shown in FIG. 5 is a load required for starting contraction of the shock absorbing type steering shaft 11 which has the outer shaft 12 and the inner shaft 13 fitted to each other only by the above-mentioned normal fitting length L, so as to lengthen the fitting length of the shafts 12 and 13.

According to the experiments conducted by the present inventors, when an engaged portion between the outer shaft 12 and the inner shaft 13 was plastically deformed by the pressing pieces 20a' and 20a' having the pair of flat surfaces 23 and 23 parallel to each other as the pressing surfaces thereof, the pressing load and the contraction load were substantially proportional to each other.

Figure 18:
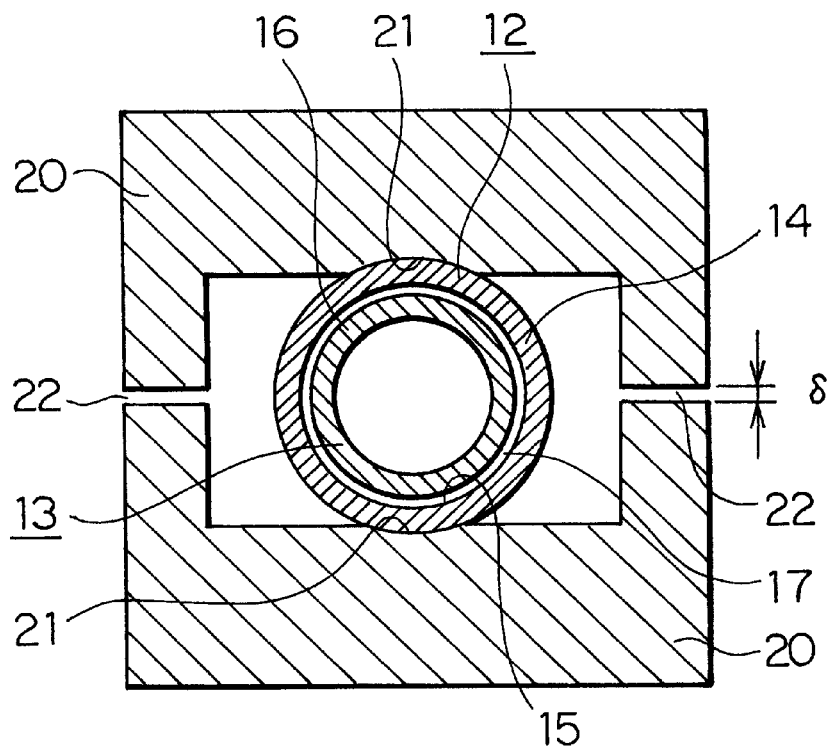
FIG. 18 is a cross-sectional view taken along the line F—F of FIG. 17 in a state before plastic deformation.
Figure 21:
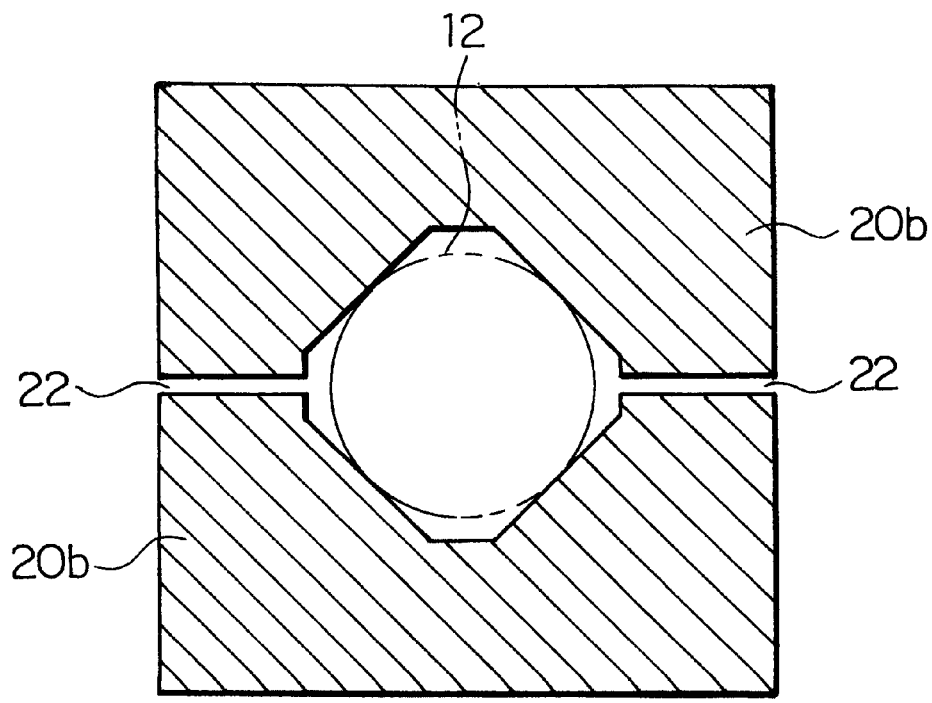
FIG. 21 is a cross-sectional view taken along in the same manner as FIG. 18, for showing a step of a third known method of manufacturing such steering shaft.

Contrarily, when the pressing pieces 20 and 20 having the recesses 21 and 21 of an arcuate shape as shown in FIGS. 18 and 19 or the pressing pieces 20b and 20b of a V block shape as shown in FIG. 21 were used, it was found that the pressing load and the contraction load were hardly proportional to each other so that it is difficult to adjust the contraction load by the pressing load.

According to the method of adjusting a contraction load of a shock absorbing type steering shaft of the present invention which is conducted in such a manner as described above, a load required for contracting a shock absorbing type steering shaft 11 is regulated to a desirable value so as to realize a steering device which can effectively protect the driver at a secondary collision. Moreover, the bending rigidity of the fitted portion between the outer shaft 12 and the inner shaft 13 when the two shafts are fitted into each other only by the above-mentioned normal fitting length L is higher (larger) so as to prevent this fitted portion from being shaky in normal condition. The reasons for this will be described with reference to FIGS. 6 and 7.

As described above, in the shock absorbing type steering shaft 11 for which the present invention is conceived, after the cross-sectional shapes of the end portion of the outer shaft 12 and the end portion of the inner shaft 13 are plastically deformed in the state in which the end portion of the outer shaft 12 and the end portion of the inner shaft 13 are brought into engagement with each other as shown in FIG. 1, these shafts 12 and 13 are displaced toward each other as shown in FIG. 3. For this reason, these shafts 12 and 13 are strongly fitted to each other at two locations which are separated away in the axial direction, as seen in FIG. 3, and the fitting strength at an intermediate portion between the two locations becomes very weak. Accordingly, in order to strengthen the bending rigidity of the fitted portion between the shafts 12 and 13, it is required to strengthen the fitting strength at these two locations. Since these fitted portions at the two locations are formed by keeping a first deformed portion 18 and a second deformed portion 19 which have been simultaneously plastically deformed away from each other in the axial direction (as shown in FIG. 3), the fitting strength is required to be the same at the above-mentioned two locations in order to strengthen bending rigidity.

Figure 6:
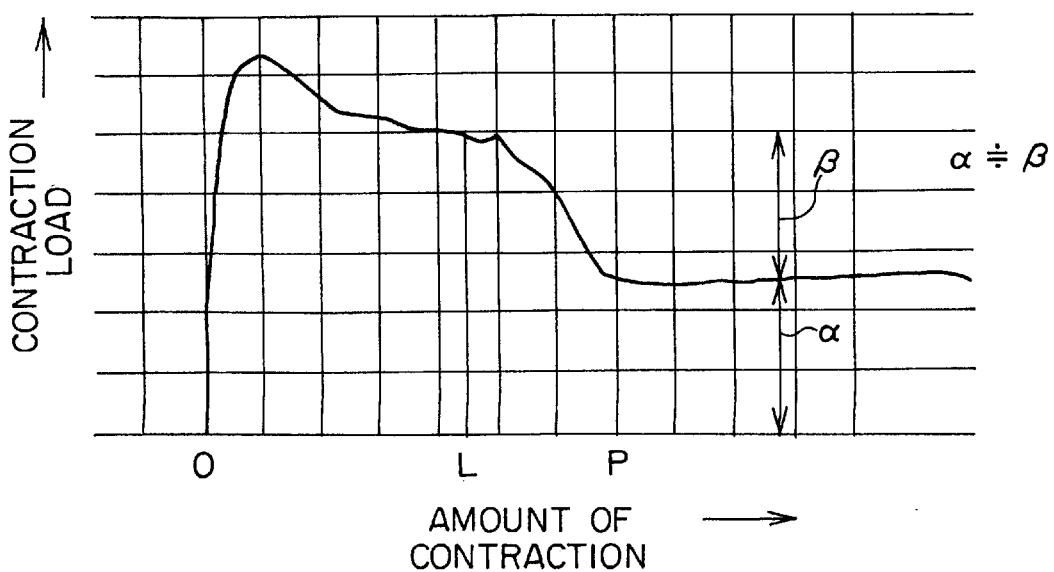
FIG. 6 is a graph for showing the relation between an amount of contraction and a contraction load of a shock absorbing type steering shaft which is manufactured by adjusting the contraction load according to the present invention.

The present inventors have made experiments to a certain the degree of an influence of the difference in shape among the pressing pieces 20, 20a and 20b mentioned above on the fitting strength of the fitted portion of the shock absorbing type steering shaft 11 to be obtained. As a result, when it was found that the engaged portion between the outer shaft 12 and the inner shaft 13 is plastically deformed by the pressing pieces 20a' and 20a' whose the pressing surfaces 23 and 23 are flat andparallel to each other, the relation between an amount of contraction and a contraction load of the shock absorbing type steering shaft 11 is as shown in FIG. 6. In FIG. 6, the amount of contraction is plotted along the abscissa and the contraction load is plotted along the ordinate. The position zero of the abscissa indicates the position or state in which the outer shaft 12 and the inner shaft 13 are separated away from each other while the engaged portion between the outer shaft 12 and the inner shaft 13 remains plastically deformed, as shown in FIG. 1 (or FIG. 17). Also, the position of the normal fitting length L on the abscissa indicates the position or state in which the shafts 12 and 13 are fitted to each other in a normal use condition.

Further, the position of the point P on the abscissa indicates the position or state in which the above-mentioned shock absorbing type steering shaft 11 has been contracted due to a contraction load generated during a collision so that the second deformed portion 18 formed on the one end portion of the inner shaft 13 has been taken out from the female serration 15 of the outer shaft 12. In this state indicated by the position of the point P, the contraction load required for contracting the shock absorbing type steering shaft 11 only includes a force for resisting the fitted portion between the second deformed portion 19 formed on the one end portion of the outer shaft 12 and the male serration 17 on the outer peripheral surface of the inner shaft 13. Accordingly, if the contraction load $\alpha$ at this point P is about a half the contraction load at the above-mentioned normal fitting length L position, the fitting strength will be substantially equal at the above-mentioned two locations. According to the experiments conducted by the present inventors, it was found that by appropriately setting the normal fitting length L, the contraction load $\alpha$ at the position P becomes substantially equal to the decrease $\beta$ of the contraction load from the normal fitting length L to the position P ($\alpha=\beta$) and the fitting strength becomes substantially the same at the above-mentioned two locations.

Figure 7:
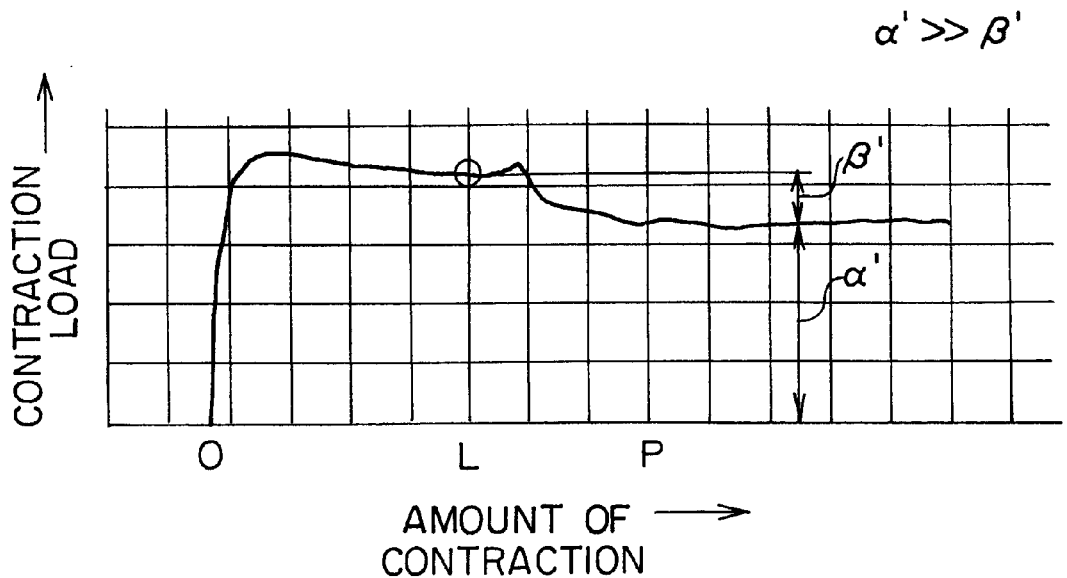
FIG. 7 is a graph for showing the relation between an amount of contraction and a contraction load of a shock absorbing type steering shaft which is manufactured by a method other than that of the present invention.

On the other hand, when the pressing pieces 20 and 20 which have the arcuate recesses 21 and 21 as shown in FIGS. 18 and 19 or the pressing pieces 20b and 20b in a V block shape as shown in FIG. 21 were used to form the shock absorbing type steering shaft 11, a contraction load $\alpha'$ at a portion corresponding to the position of the point P and a contraction load decrease $\beta'$ from a portion corresponding to the normal fitting length L to a portion corresponding to the position of the point P were largely different from each other as shown in FIG. 7. Such a large difference between the both two loads $\alpha'$ and $\beta'$ as mentioned above means that the fitting strength of the fitted portion between the outer shaft 12 and the inner shaft 13 is small.

Note that in the structure illustrated in the drawings, the small-diametered portion 14 is formed on the end portion of the outer shaft 12, while the large-diametered portion 16 is not formed on the end portion of the inner shaft 13. Instead, the length in the axial direction of the male serration 17 formed on the outer peripheral surface of the end portion of this inner shaft 13 is sufficiently secured. However, the constitution of this part is to be selectively designed in accordance with an amount of contraction (stroke) required for the shock absorbing type steering shaft 11. Also, in the state in which one end of the outer shaft 12 and one end of the inner shaft 13 have been brought into engagement with each other, the flat surfaces 23 and 23 of the pair of pressing pieces 20a' and 20a' which press these two shafts 12 and 13 inwardly in the diametral direction can be satisfactorily used so long as portions thereof contacting the outer peripheral surface of the outer shaft 12 are substantially flat, if these portions are curved a little.

Figure 9:
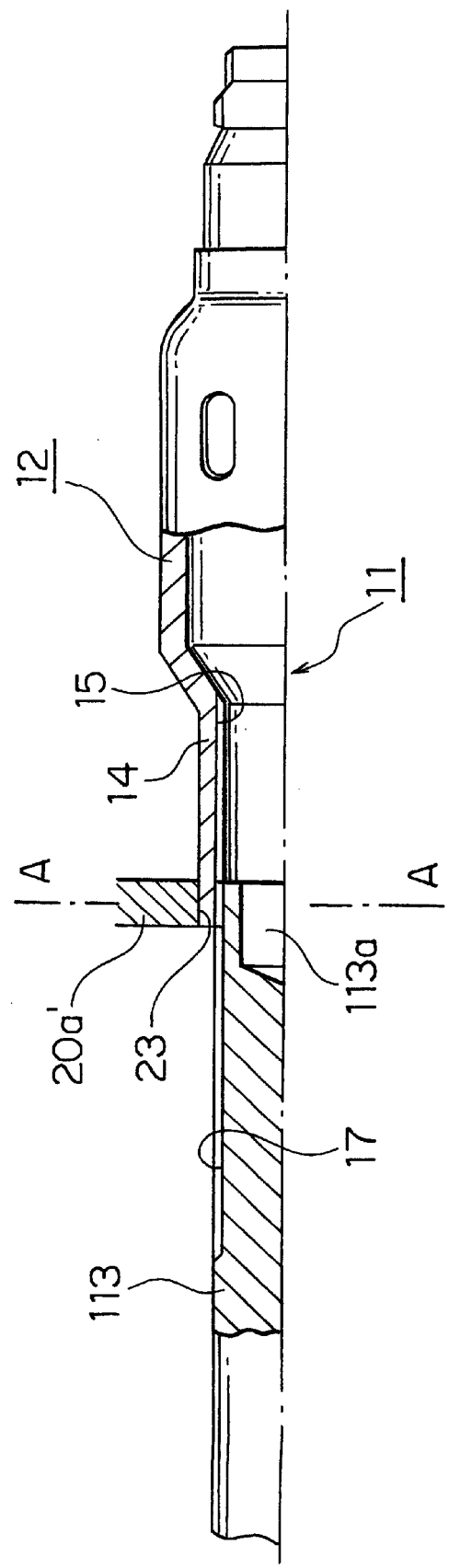
FIG. 9 is partial cross-sectional view for showing a modification of the embodiment of the present invention.
Figure 10:
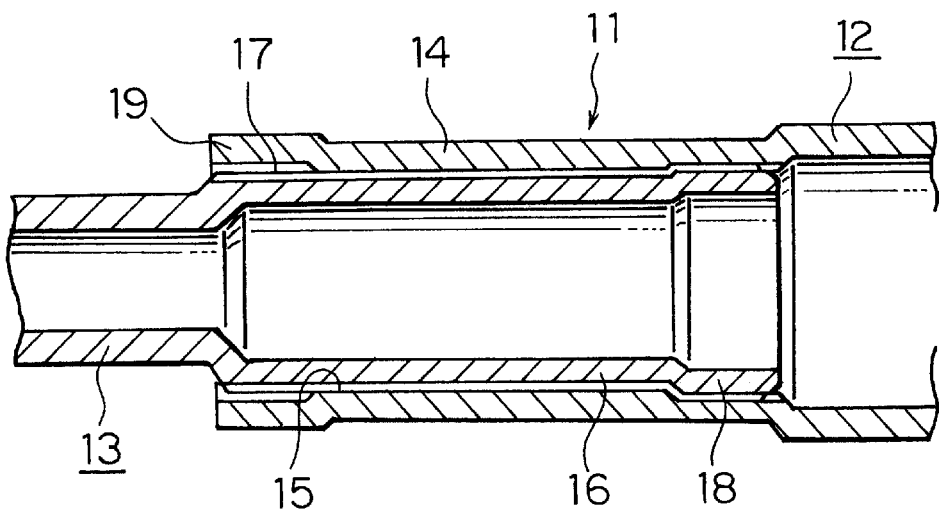
FIG. 10 is a cross-sectional view for showing principal portions of a prior art structure.
Figure 11:
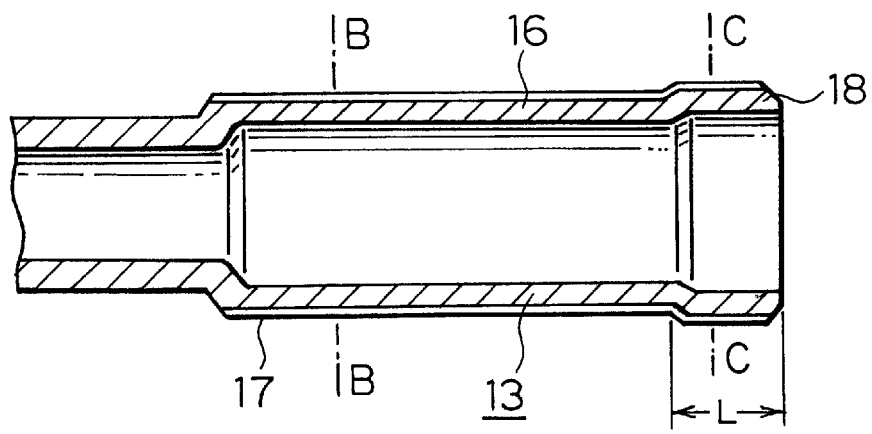
FIG. 11 is a cross-sectional view for showing an inner shaft to be incorporated in the prior art structure.
Figure 12:
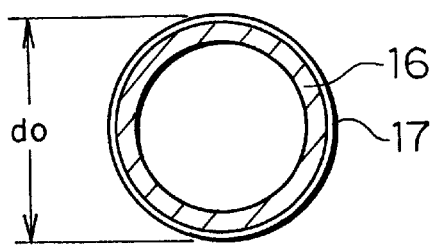
FIG. 12 is a cross-sectional view taken along the line B—B line of FIG. 11.
Figure 13:
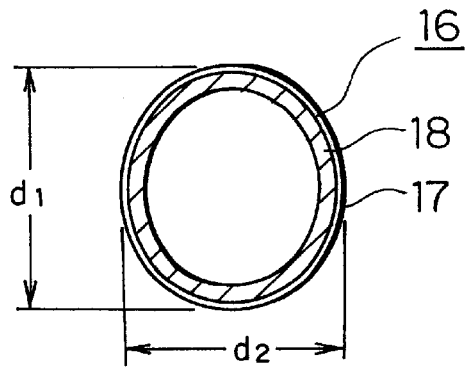
FIG. 13 is a cross-sectional view taken along the line C—C line of FIG. 11.
Figure 14:
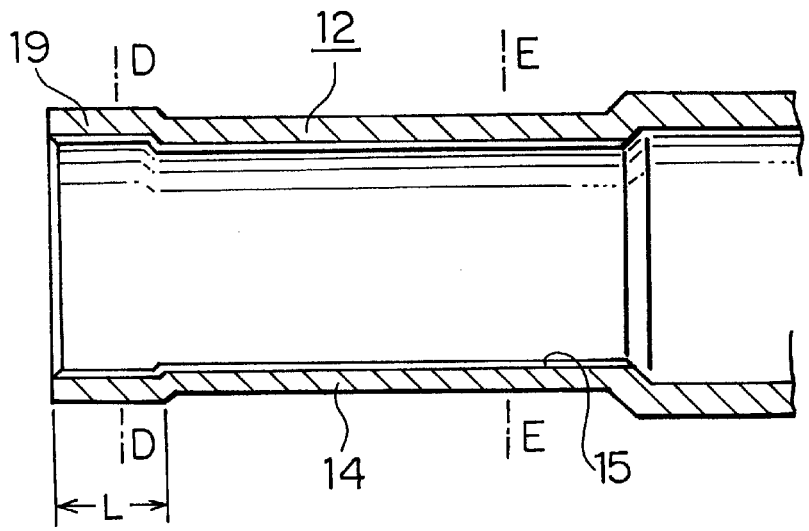
FIG. 14 is a cross-sectional view for showing an outer shaft to be incorporated in the prior art structure.
Figure 15:
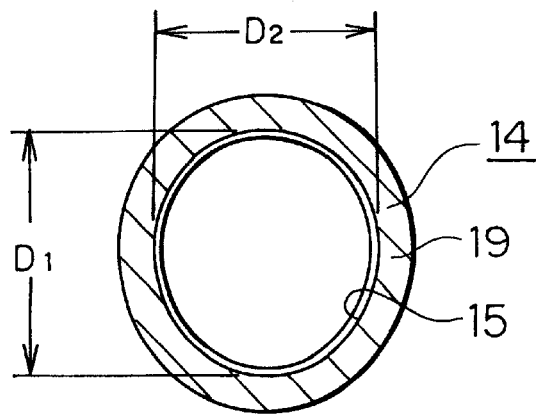
FIG. 15 is a cross-sectional view taken along the line D—D line of FIG. 14.
Figure 16:
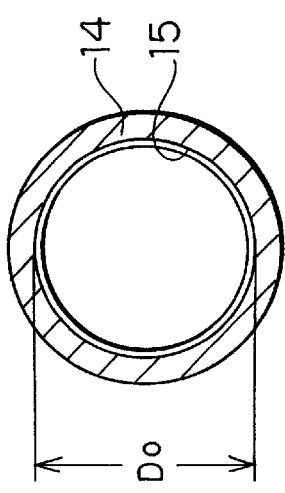
FIG. 16 is a cross-sectional view taken along the line E—E line of FIG. 14.
Figure 17:
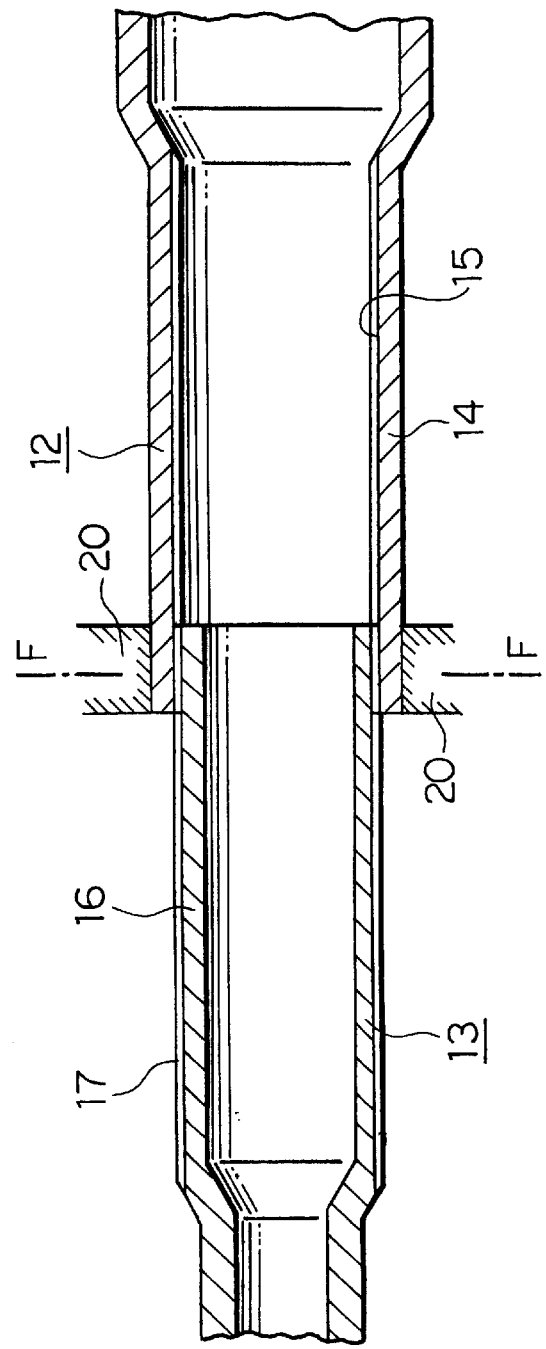
FIG. 17 is a cross-sectional view of principal ortions for showing a step of a first known method f manufacturing a shock absorbing type steering haft.

FIG. 9 shows a modification of the above-mentioned embodiment, in which an inner shaft 113 is solid except a right end portion which is formed with an axial bore 113a to be tubular. The remaining structure of this modification is the same as the first embodiment above-mentioned.

For preparing such a solid inner shaft or column member, a solid shaft or column member is first formed with a male serration by rolling or pressing, and thereafter an axial bore 113a is formed at an end of the solid shaft member.

The method of adjusting a contraction load of a shock absorbing type steering shaft is framed and effected as described above, so that this method can contribute to the attainment of a steering device which can effectively protect a driver during a secondary collision.

The outer as well as inner column member whose female as well as male serration is formed by pressing pushing a die to a column or vice versa, is superior to one formed by rolling or other processing in surface roughness, so that there is less fluctuation of contraction load of a shock absorbing type steering shaft or column assembly and a more stable property of the assembly can be attained.

What is claimed is:

1. A method of manufacturing a contractible, shock absorbing steering column assembly including an outer column member having a female serration formed on an inner peripheral surface portion thereof, and an inner column member having a male serration formed on an outer peripheral surface portion thereof and engaged with the female serration of said outer column member, each of said portions of said outer and inner column members having a first portion, a second portion and an intermediate portion between the first portion and the second portion, said method comprising:

inserting said first portion of said inner column member in said first portion of said outer column member;

disposing said first portions between an opposed pair of pressing members having respective pressing surfaces that are flat and opposed in parallel to each other;

pressing an outer peripheral surface of said first portion of said outer column member inwardly in a diametral direction thereof with said pressing members under a predetermined pressing load while maintaining said pressing surfaces parallel to each other, so as to plastically deform said first portions of said outer and inner column members; and relatively displacing said outer column member and said inner column member axially toward each other to bring said first portion of said outer column member and said first portion of said inner column member to positions at which said intermediate portions of said outer and inner column members are in loose engagement with each other, and said first portion of said outer column member and said first portion of said inner column member are in pressure-fitting engagement, under substantially equal fitting strength, with said second portion of said inner column member and said second portion of said outer column member, respectively.

2. A shock absorbing steering column assembly manufactured according to the method of claim 1.

3. A method of manufacturing a contractible, shock absorbing steering column assembly including an outer column member having a female serration formed on an inner peripheral surface portion thereof, and an inner column member having a male serration formed on an outer peripheral surface portion thereof and engaged with the female serration of said outer column member, each of said portions of said outer and inner column members having a first portion, a second portion and an intermediate portion between the first portion and the second portion, said method comprising:

inserting said first portion of said inner column member in said first portion of said outer column member;

disposing said first portions between an opposed pair of pressing members having respective pressing surfaces that are flat and opposed in parallel to each other;

adjusting a pressing load of said pressing members in accordance with a desired contraction load;

pressing an outer peripheral surface of said first portion of said outer column member inwardly in a diametral direction thereof with said pressing members under said pressing load while maintaining said pressing surfaces parallel to each other, so as to plastically deform said first portions of said outer and inner column members; and relatively displacing said outer column member and said inner column member axially toward each other to bring said first portion of said outer column member and said first portion of said inner column member to positions at which said intermediate portions of said outer and inner column members are in loose engagement with each other, and said first portion of said outer column member and said first portion of said inner column member are in pressure-fitting engagement with said second portion of said inner column member and said second portion of said outer column member, respectively, to provide the desired contraction load.

4. A shock absorbing steering column assembly according to claim 3, wherein said positions are determined such that the pressure-fitting engagement of said first portion of said outer column assembly with said second portion of said inner column member and the pressure-fitting engagement of said first portion of said inner column member with said second portion of said outer column member provide substantially equal components of said contraction load.

5. A shock absorbing steering column assembly manufactured according to the method of claim 3.

6. A shock absorbing steering column assembly manufactured according to the method of claim 4.

* * * * *